United States Patent
Johncock et al.

(10) Patent No.: US 10,448,776 B2
(45) Date of Patent: Oct. 22, 2019

(54) COOKING SYSTEM

(71) Applicant: WHIRLPOOL CORPORATION, Benton Harbor, MI (US)

(72) Inventors: James Johncock, Shelbyville, MI (US); Alberto Morandotti, Cassinetta (IT); Cristiano Vito Pastore, Cassinetta (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 269 days.

(21) Appl. No.: 15/358,531

(22) Filed: Nov. 22, 2016

(65) Prior Publication Data

US 2017/0150841 A1 Jun. 1, 2017

(30) Foreign Application Priority Data

Nov. 30, 2015 (EP) ...................... 15197107

(51) Int. Cl.
| | |
|---|---|
| A47J 43/28 | (2006.01) |
| A47J 27/00 | (2006.01) |
| A23L 5/10 | (2016.01) |
| A47J 27/62 | (2006.01) |
| G05B 15/02 | (2006.01) |
| G01K 13/00 | (2006.01) |

(52) U.S. Cl.
CPC ............ *A47J 27/002* (2013.01); *A23L 5/10* (2016.08); *A47J 27/62* (2013.01); *A47J 43/28* (2013.01); *A47J 43/281* (2013.01); *A47J 43/283* (2013.01); *A47J 43/288* (2013.01); *G01K 13/00* (2013.01); *G05B 15/02* (2013.01); *G01K 2207/06* (2013.01)

(58) Field of Classification Search
CPC .......... A47J 43/18; A47J 43/28–43/283; A47J 43/288; A47J 2202/00; A47J 27/002; A47J 27/62; G01K 2207/00–2207/08; G01K 13/00; A23L 5/10; G05B 15/02
USPC ............ 426/231–233; 99/325–338, 342–344
See application file for complete search history.

(56) References Cited

U.S. PATENT DOCUMENTS

| | | | |
|---|---|---|---|
| 6,536,068 B1 * | 3/2003 | Yang | A46B 15/0002 15/105 |
| 6,698,923 B2 * | 3/2004 | Bedetti | A47J 43/28 374/149 |
| 6,753,027 B1 | 6/2004 | Greiner et al. | |
| 7,424,388 B2 * | 9/2008 | Sato | A63F 13/06 345/156 |
| 8,342,080 B2 * | 1/2013 | Richardson | F24C 7/08 126/332 |

(Continued)

FOREIGN PATENT DOCUMENTS

| | | |
|---|---|---|
| DE | 3119496 | 12/1982 |
| DE | 10 2011 080246 | 2/2013 |

(Continued)

*Primary Examiner* — Drew E Becker
(74) *Attorney, Agent, or Firm* — Price Heneveld LLP

(57) ABSTRACT

A cooking system includes a kitchen utensil and a cooking hob, wherein the kitchen utensil is provided with one or more sensors arranged on the kitchen utensil. The sensors include acceleration sensors, gyroscopic sensors, and inclination sensors. The cooking appliance is provided with a control unit configured to receive data from the sensors and to elaborate information on how the kitchen utensil is being used, and to control the cooking appliance accordingly.

12 Claims, 7 Drawing Sheets

(56) References Cited

U.S. PATENT DOCUMENTS

| | | | | |
|---|---|---|---|---|
| 8,992,346 | B1* | 3/2015 | Raposo | G01C 21/16 |
| | | | | 473/407 |
| 9,981,197 | B2* | 5/2018 | Akavia | A63H 33/3055 |
| 2002/0124737 | A1 | 9/2002 | Bedetti et al. | |
| 2010/0160041 | A1* | 6/2010 | Grant | G06F 3/0483 |
| | | | | 463/31 |
| 2011/0044370 | A1* | 2/2011 | Schochet | A47J 43/283 |
| | | | | 374/155 |
| 2011/0253693 | A1* | 10/2011 | Lyons | A47J 27/00 |
| | | | | 219/209 |
| 2013/0171304 | A1* | 7/2013 | Huntley | G06Q 50/00 |
| | | | | 426/231 |
| 2014/0086274 | A1 | 3/2014 | Henke | |
| 2015/0093480 | A1* | 4/2015 | Biever | A47J 43/16 |
| | | | | 426/281 |
| 2015/0208858 | A1* | 7/2015 | Robbins | A47J 45/068 |
| | | | | 426/231 |
| 2015/0351883 | A1* | 12/2015 | Hwang | A61C 17/221 |
| | | | | 15/22.1 |
| 2015/0360081 | A1* | 12/2015 | Zhao | A63B 24/0021 |
| | | | | 473/231 |
| 2016/0051078 | A1* | 2/2016 | Jenkins | A47J 27/62 |
| | | | | 99/331 |
| 2016/0069853 | A1* | 3/2016 | Mitchell | A47J 36/00 |
| | | | | 374/142 |
| 2016/0372005 | A1* | 12/2016 | Bajpai | G09B 19/0092 |
| 2016/0374501 | A1* | 12/2016 | Logan | A47J 36/00 |
| | | | | 426/231 |
| 2017/0001070 | A1* | 1/2017 | Zhao | A63B 51/00 |
| 2017/0173489 | A1* | 6/2017 | Akavia | A63H 33/3055 |
| 2017/0243515 | A1* | 8/2017 | Vengroff | A47J 27/62 |
| 2018/0199761 | A1* | 7/2018 | Gogorza Segurola | A47J 43/04 |
| 2018/0242772 | A1* | 8/2018 | Jenkins | A47J 27/62 |

FOREIGN PATENT DOCUMENTS

| | | | | |
|---|---|---|---|---|
| DE | 102011080246 A1 * | 2/2013 | | A47J 43/281 |
| EP | 1239703 | 9/2002 | | |
| EP | 1532902 | 5/2005 | | |
| WO | 2012149997 | 11/2012 | | |

* cited by examiner

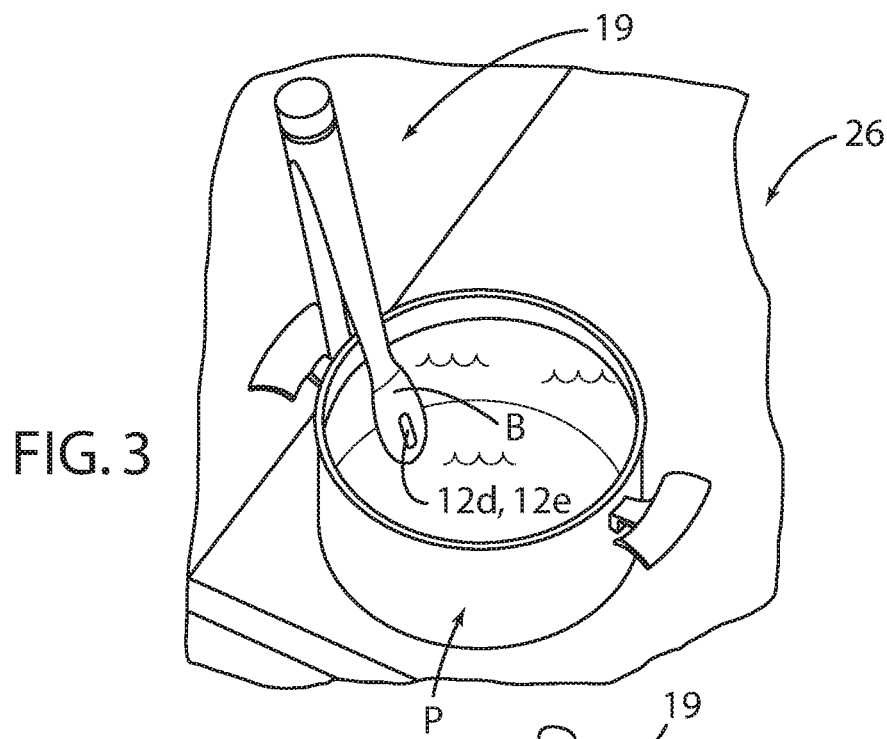
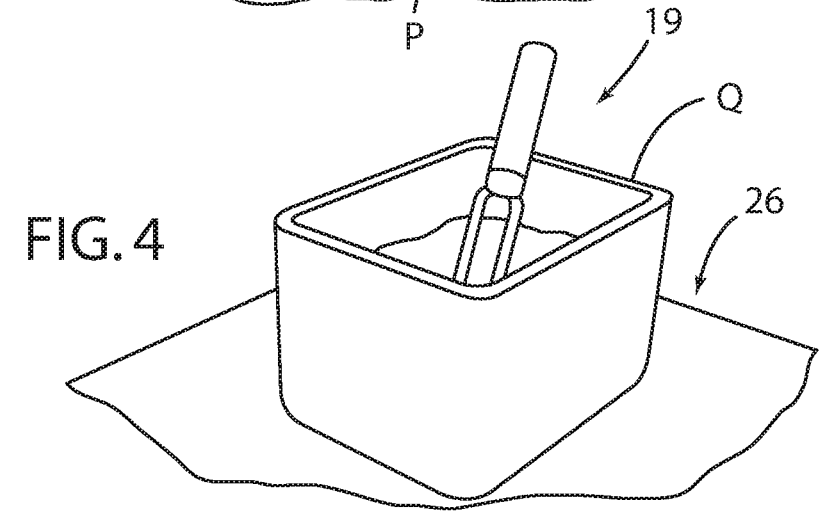
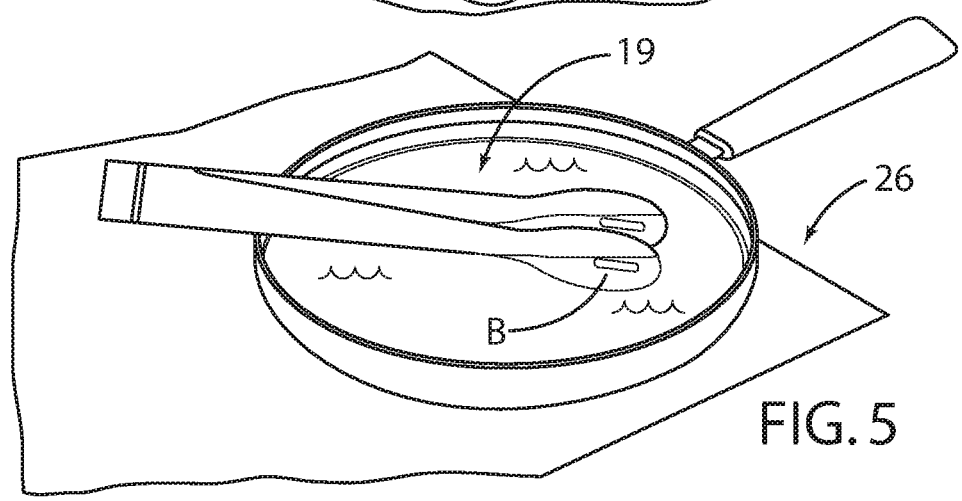

FIG. 6
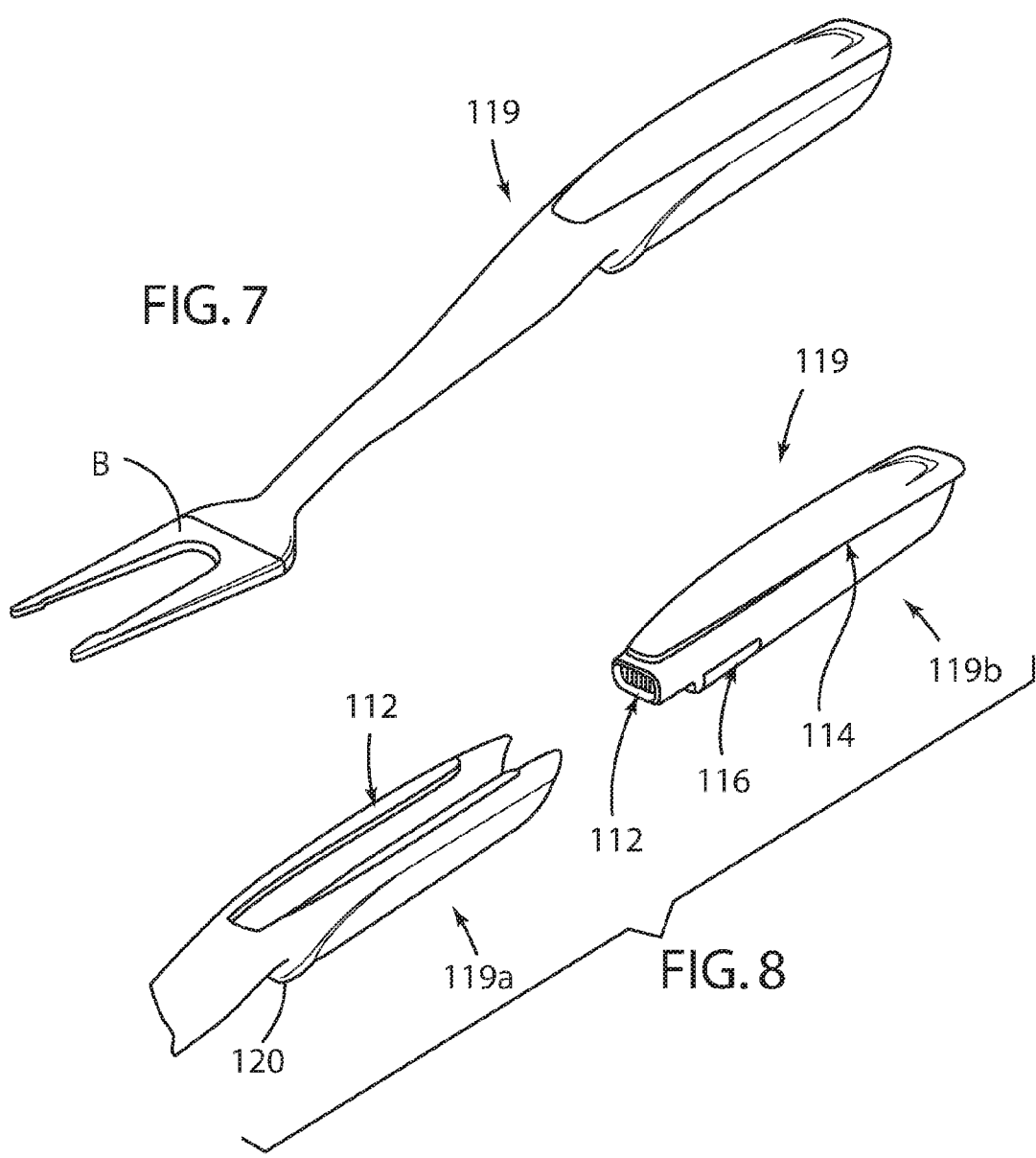

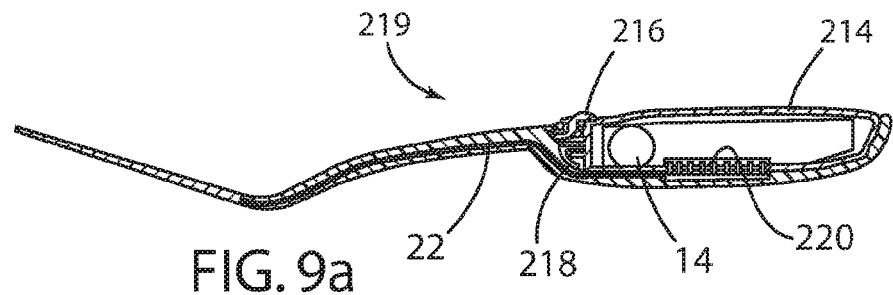
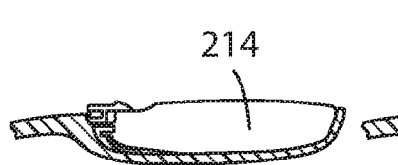
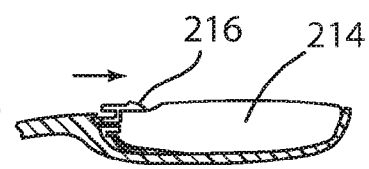
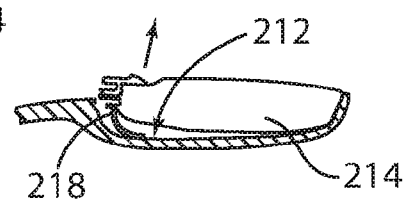
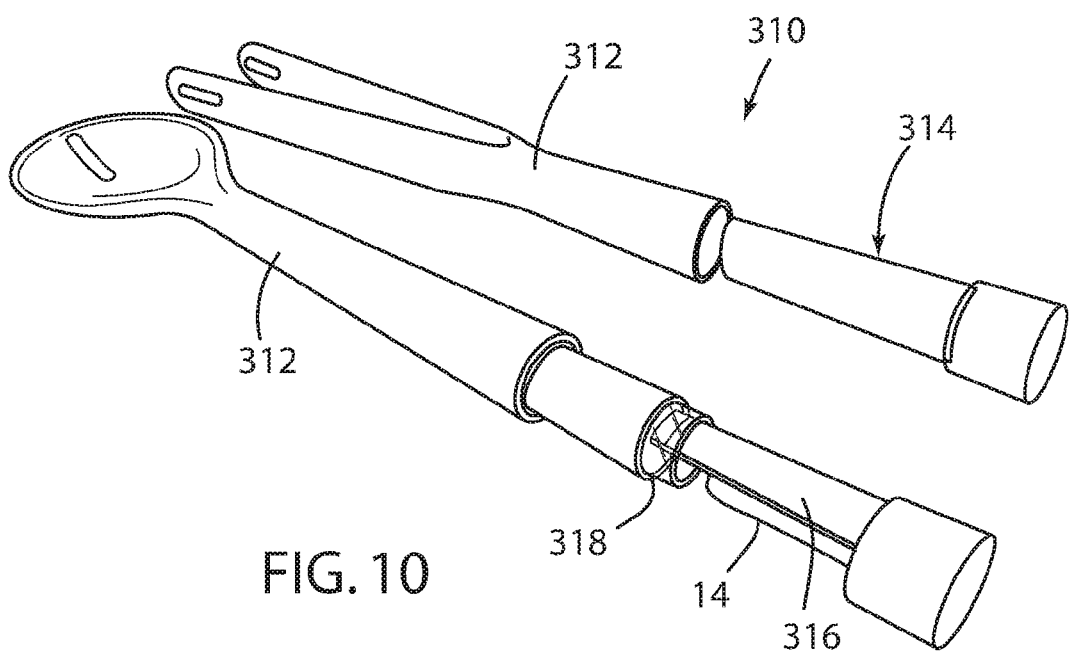

COOKING SYSTEM

CROSS-REFERENCE TO FOREIGN PRIORITY APPLICATION

The present application claims the benefit under 35 U.S.C. § 119(b) of European Patent Application No. EP 15197107.4 filed Nov. 30, 2015, entitled "Cooking System."

FIELD OF THE INVENTION

The present disclosure relates to a cooking system including a kitchen utensil and a household electrical appliance, particularly a cooking hob, wherein the utensil has sensors that are arranged at the handle of the utensil.

BACKGROUND OF THE INVENTION

A utensil having sensors in the handle is disclosed by DE102011080246. In that utensil, infrared sensors are arranged for determining the position of the utensil on the hob by a plurality of fixed infrared beacons provided on the cooking hob.

Other "intelligent" kitchen utensils are known in the art. Such known utensils include lance-shaped thermometers that may be inserted into foodstuff, such as meat and fish, both for pan cooking and for convection ovens. Such lance thermometers come either in the form of simple electromechanical devices or electronic ones, and in some cases they are equipped with wireless communication means with the appliance in order to perform an automatic regulation of the energy sources with the object of reaching target temperatures.

Temperature probes of the type described in EP1239703B1 combine temperature information with other physical parameters related to food state, such as conductivity, humidity, and vibration.

One drawback of such temperature probes is that they are not able to determine the actual action being performed with the utensil itself, thus resulting in the inability to relate the sensed quantities to the use scenario being performed by the user (i.e., the use context). For instance, the information returned by a temperature sensor has a different meaning if captured with the utensil being inserted stationary inside a casserole versus the case when the utensil is being used to stir a risotto. Even if not manipulated (i.e., zero acceleration), the information read by the sensor is interpreted differently if the probe is dipped vertically inside a pot compared to inserted horizontally inside a roast. In other words, the knowledge of the position, displacement, and acceleration is fundamental for the correct interpretation of the sensor readings.

DE3119496 and U.S. Pat. No. 6,753,027B1 try to obviate those limitations by adopting multiple temperature measuring points along the part of the probe which is to be inserted into the food. Although the plurality of temperature sensors mitigates the problem of detecting the very core temperature of the food, they all have the drawback of being unable to detect the actual position of the probe with respect to the food, resulting in largely varying results caused by the degree of expertise of the user or cook in correctly placing the probe. To partially obviate to that limitation, WO2012149997A1 proposes a method to assess probe tip orientation with respect to food surface, based on the relationship among the different temperatures monitored along the different measuring points positioned on the probe itself. However this temperature-based determination of the probe inclination might be highly disturbed by food anisotropy (i.e., non-uniformity) and spatial gradient in the heat application sources.

The activity of cooking food items with cooking hobs entails a high degree of attention from the cook to manually regulate the burner's power output in accordance to the recipe requirements. Such regulation generally occurs based on a cook's sensorial perception (visual, olfactory, texture), which is often weakly related with actual food state. Although professional and experienced cooks have developed great skill in inferring the actual cooking state from the aforementioned sensorial inputs, average cooks often struggle with the correct interpretation of such sensorial inputs, thus resulting in poorly prepared meals.

SUMMARY OF THE INVENTION

An object of the present disclosure is to provide a user with a cooking system using a cooking utensil which is able to assist the cook in the process of determining the actual state of the food being cooked by relying on multiple inputs simultaneously and, on the basis of the monitored physical states, adapting the cooking hob output to achieve and hold the desired food state.

More specifically, it is an object of the present disclosure, to provide a cooking system in which the kitchen utensil used therein is not merely able to sense known physical parameters, such as temperature or humidity, or the position of the utensil and therefore of the cooking utensil, but also to determine the tool's use pattern over time. Such object is reached by virtue of the features listed in the appended claims.

According to one of the features of the claims, the kitchen utensil associated with the household electrical appliance is provided with at least a multi-axis accelerometer and/or gyroscope, with the aim of assessing the context of use of the utensil itself. The kitchen utensil according to the present disclosure can determine and control the food's cooking state based on multiple physical quantities related to food state, such as temperature and food conductivity, and combining such information with probe spatial position and acceleration along multiple axes, in order to understand which action is being performed with the utensil, with the purpose of interpreting and conditionally processing the sensed physical quantities accordingly. Kitchen utensils according to the present disclosure broaden the function and the utility of the intelligent kitchen utensils known up to now, helping the cook in significantly improving the result of the performed cooking processes.

According to a further feature of the disclosure, the shape of the kitchen utensil according to the invention is such that it can be used both as a lance (to detect the core temperature of bulky pieces of foods) or as tongs (to measure surface temperature of thin food). In one preferred embodiment, the kitchen utensil comes in the form of tongs of the kind normally used by cooks to flip food in the pan, equipped with two or more temperature sensors distributed along the tong arms, up to the vicinity of its tips. In a further preferred embodiment, one of the arms of the tongs could be shaped in the form of a lance to enable insertion into bulky foods.

Moreover, according to another embodiment, two or more electrically conductive contacts might be placed in the vicinity of the tongs tips, to monitor food juiciness or water/salt content through the measurement of the impedance across any pairs of those contacts.

In another preferred embodiment, the data processing of the signals obtained by the conductivity sensors signals are conditioned to the handling condition identified through acceleration, inclination, and/or strain information. For instance, the conductivity measurement is used to determine food conductivity only whenever the tool inclination is within a given range, corresponding to the typical orientation being assumed when a cook grabs the food with a tongs and is otherwise discarded in any other orientation angles.

In another example of conditional processing, the conductivity strips would be used to determine the starch concentration in the water contained in a pot where potatoes or pasta are boiled. In this particular configuration, the kitchen utensil would be positioned in a vertical position. Should the orientation of the probe deviate from that particular vertical position by +/−10° or more, and/or its acceleration along any axis exceeds 0.1 m/s$^2$, the kitchen utensil be deemed to be manipulated by the user and then no longer being steadily immersed into the water bath. In such case, the monitoring of the conductivity must be suspended until the correct stationary, vertical orientation is achieved again.

In all the aforementioned embodiments, in order to provide information on the spatial orientation of the utensil as well as its trajectory in the space, a multi-axial accelerometer/gyroscope/inclinometer is provided within the tool, particularly within the handle thereof. Such device is coupled with a transmitter that sends to the electronic control unit of the household cooking appliance signals about rotational (inclination) and translational (position) movements of the tool in the space. The mathematical processing of those signals allows the determination of the action being performed by the cook with the utensil itself (such as stirring, food flipping, food grabbing, or stationary positioning of the utensil tips inside the pan, for instance, during deep frying or stewing).

Once the action performed on the food by the cook is determined through the accelerometer/gyroscope, the temperature/conductivity information may be processed with a much higher level of correlation with the food actual state. For instance, during the initial heat-up phase of stir frying, the kitchen utensil would be laid horizontally and steadily (acceleration <0.01 m/s$^2$), with the tongs tip dipped into the oil film. In that case, the cooking process would be controlled through a closed loop control of the oil temperature, just relying on the temperature sensor on the very tip of the probe, ignoring the other sensors.

Whenever the cook would use the kitchen utensil to stir the food, its inclination and acceleration would deviate from the conditions previously indicated. In such conditions, should the closed loop temperature control be maintained with the same logic, it would result in a sudden increase of cooking hob power, caused by the momentarily exposure of the temperature sensors to the ambient air temperature instead of the hot oil. On the other hand, a tool according to the present disclosure would detect the momentary tool manipulation through the acceleration and/or inclination signals and then inhibit the power increase through a differentiated action, such as a holding the feedback temperature to the last value observed before the manipulation was detected or, alternatively, by holding the delivered power until the proper tool inclination and/or acceleration is achieved again.

Furthermore, the discrimination between stir frying and deep frying could be performed by detecting the utensil acceleration combined with the difference between the temperature recorded by the sensor on the very tip (which is surely fully immersed) and the other sensors, which would be immersed only in case of deep frying.

In the case of meat searing, the food generally needs to be flipped one or more times, depending on food category. At the moment of food flipping, the tongs arm that used to be in between the meat and the pot will turn 180° and face the air and vice versa. In order for the temperature controller to keep working correctly, the feed must always be from the bottom temperature rather than the sensor in the air. To ensure this, the food flipping is detected by the accelerometer/gyroscope through a sudden change of roll coordinate (≥150°) (as per spatial coordinate convention shown in FIG. 1). Based on such information, the control would switch between the two sensors used for temperature feedback. In addition, during food flipping, it is normal that the temperatures recorded by the sensors overcome some fairly large spikes, due to momentary change of contact with the food. Thanks to the aforementioned detection of food flipping, it would be possible to reject those temperature spikes and possibly inhibit the closed loop control of the temperature until a stationary state is reached again.

In another preferred embodiment, the kitchen utensil is equipped with a strain sensor or an electrical contact to allow the determination of the time when the utensil in the form of a tongs is used to grasp the food. Based on the information given by that sensor, the temperature readings could be immediately associated with the surface temperature of the food, whereas the same temperature readings are ignored by the temperature controller whenever said strain and/or position and/or acceleration are indicating that the utensil is not actually in contact with the food, but rather just being manipulated outside the cooking area and/or far away from the foodstuff.

In another case where meat is seared or grilled, the kitchen utensil would not be inserted into the food, but rather used as a tongs, periodically used to grab and flip the food. Once again, based on accelerometer information, the very moment when the food is grabbed could be inferred and then a spot measurement of the temperatures would be triggered to detect surface temperature of the food. Moreover, impedance measurements could be triggered to detect surface browning through the ratio between surface impedance (measured across adjacent contact on the same arm of the tongs) and bulk impedance (measured across contacts sitting on different arms of the tongs). The trigger condition for those impedance and/or temperature measurements would be given by the simultaneous permanence of the kitchen utensil spatial coordinates within predetermined ranges for more than a predetermined time.

In the particular case of a tongs form of the kitchen utensil according to the present disclosure, an additional force sensor could be employed in order to detect the act of clamping the food and/or an additional angle sensor (preferably located in the tongs' hinge) could be used to detect food thickness.

It is evident that all the described measurements (temperature, impedance, humidity) would be hardly correlated with food state unless information on the utensil use (i.e., information from the accelerometer and/or gyroscope) is available.

The kitchen utensil according to the invention could be advantageously used both to assist pan-cooking, as described, and to assist pot cooking by laying the utensil vertically across the pot's rim, thus having one end of the tongs immersed in the cooking liquid and the other end exposed to the ambient. Because of the gyroscope information, the utensil could easily self-determine that it is used in this particular mode, by detecting a substantially vertical orientation and a substantially stationary operation (zero acceleration along the vertical axis). When used in such mode, the cooking liquid inside the pot could be regulated at a given temperature by controlling heating element power output by using known closed loop regulation. The measurement of the conductivity across any couple of immersed electrical contacts may give an indication of the ionic content of the cooking liquid, which is directly associable with salt and starch concentration, which vary, such as during the boiling of pasta or rice. Moreover, in case multiple electrical contacts are placed along the length of the utensil, a determination of the liquid level could be performed by detecting which pairs of contacts are actually shorted by the liquid. The impedance measurement could be aimed at the determination of the resistive part of the impedance or, more advantageously, to the complex impedance, thus allowing the discrimination between galvanically conductive foodstuff (ionic solution) and poorly conductive ones (pure water or fat tissue).

The kitchen utensil according to the present disclosure is configured to communicate with the control unit of the cooking hob by means of either an electrical harness or, more advantageously, through known radio frequency or optical wireless communication techniques.

Other known kind sensors could be advantageously added to the kitchen utensil according to the invention, with the aim of determining more precisely the state of the food. A non-exhaustive list of such sensors includes: chemical sensors (pH, electronic tongues), optical sensors (colorimeter, reflectometers), and strain sensors (strain gauges) to detect tongs compression state and food consistency/softness.

In another preferred embodiment of the present disclosure, the kitchen utensil interacts with a graphical "man-machine" interface adapted to show the individual steps of recipes, informing the cook about the effective actions to be performed and progressing through the recipe steps automatically. In other words, the user interface would present behavioral changes conditioned to the kitchen utensil use case, thus resulting in another form of conditional processing.

For instance, when the man-machine interface instructs the cook to turn the food, the kitchen utensil would detect the actual gesture and, once performed by the user, would automatically progress into the next step of the recipe. Alternatively, when the man-machine interface instructs the cook to add broth to a risotto, the kitchen utensil would detect the actual pouring of liquid through a combination of conductivity and temperature, both parameters being altered by the addition of that ingredient.

In another embodiment of the present disclosure, the kitchen utensil comprises a handle, into which an electronic board is inserted. One or more sensors carrying bars are connected to and protrude out of the handle and are designed to contain the temperature and conductivity sensors. In order to ensure economical manufacture and long life, all the electronic parts, including the accelerometer, gyroscope, and battery, are located in the handle, which is designed with a clinch feature to prevent it from slipping into a cooking pan or pot.

In another preferred embodiment, the battery is rechargeable through a contactless magnetic charger of known type. Independent of the type of battery used (rechargeable or non-rechargeable), the battery is designed to ensure, in conjunction with a low power electronic board, a life time of several years without need of battery replacement. These provisions allow the device to be fully sealed from the external environment so that it can be washed either by hand or in a dishwasher.

In another preferred embodiment of the present invention, the kitchen utensil is split into a handle, which carries the electronic module, electrically and mechanically connectable, in a releasable form, to a set of different tips, having the known forms of spoons, forks, tongs, or knives and carrying one or more of the aforementioned sensors (like temperature, conductivity, humidity, pH, etc.).

These and other aspects, objects, and features of the present disclosure will be understood and appreciated by those skilled in the art upon studying the following specification, claims, and appended drawings.

BRIEF DESCRIPTION OF THE DRAWINGS

FIG. 3 is a perspective view of the utensil of the present disclosure of FIG. 1 used in connection with a pot and with one arm immersed to control water temperature;

FIG. 4 is a perspective view of another version of a kitchen utensil according to the present disclosure, in the form of a fork, which is configured to detect starch concentration through conductivity;

FIG. 5 is a perspective view of the utensil of FIG. 1 used in connection with a pan;

FIG. 6 is a front view of a user interface with recipe progression indication based on detected gesture performed on the kitchen utensil of the present disclosure of FIG. 1;

FIG. 7 is a perspective view of another type of a fork-shaped kitchen utensil according to the present disclosure, in which the electronic unit is located in a removable handle;

FIG. 8 is a partial exploded view of the kitchen utensil of FIG. 7 where a removable electronic unit is located in a sliding handle and sensors are placed in the utensil tip;

FIGS. 9a-9d are cross-sectioned longitudinal views of another version of a kitchen utensil according to the present disclosure;

FIG. 10 shows a further version of kitchen utensils according to the present disclosure where a sensorized tip is detachably mounted on an electronic board;

DETAILED DESCRIPTION OF THE EMBODIMENTS

Figure 1:
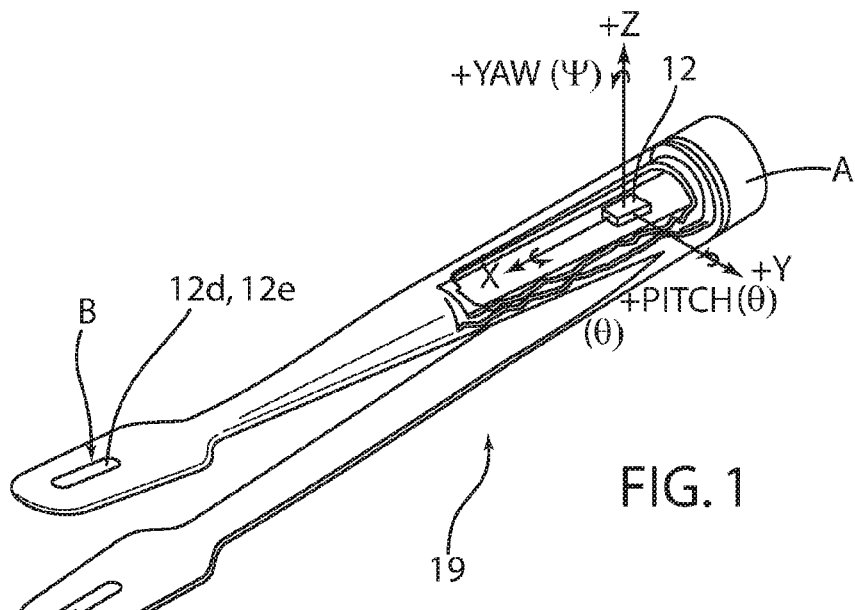
FIG. 1 is a perspective view of a kitchen utensil according to the present disclosure in the form of tongs, where spatial coordinates for rotational (inclination) and translational (position) are indicated.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the drawings, a kitchen utensil 10 shaped as a pair of tongs presents a sensor 12 capable of detecting acceleration and spatial position of the kitchen utensil 10, with the term "spatial position" being the yaw, pitch, and roll angles (referred to as a fixed reference position). The sensor 12 comprises an accelerometer 12a and a gyroscope 12b, which are both power supplied by a battery 14 (FIG. 2) and which are connected to a microcomputer 16 and a wireless data transmitter 18.

Figure 2:
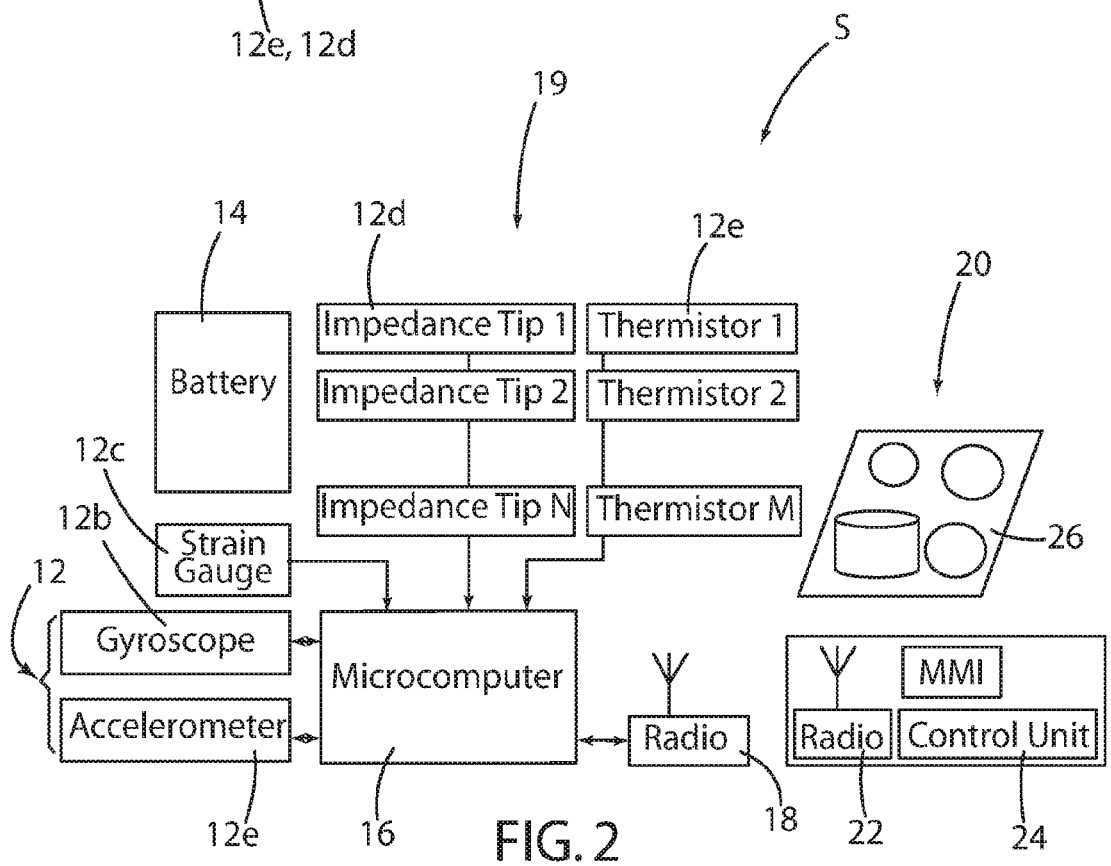
FIG. 2 is a block diagram of the cooking system according to the present disclosure in which the kitchen utensil of FIG. 1 is used.

With reference to FIG. 2, the cooking system S according to the present disclosure comprises, on one hand, the kitchen utensil 10 and, on the other hand, a cooking hob 20, which comprises a wireless data receiver 22 and a control unit 24 configured to drive heating elements for heating cooking vessels placed on a cooking plate 26.

In addition to the accelerometer 12a and the gyroscope 12b, the kitchen utensil 10 comprises other sensors, for instance a strain gauge 12c placed preferably in a zone A, where the two pair of tongs are connected, as well as impedances 12d and temperature sensors 12e, which are each placed in end zones B of the tongs, and which are designed to come into contact with food during the cooking process. Also these sensors 12c, 12d, and 12e are connected to the microcomputer 16 as well.

Figure 12:
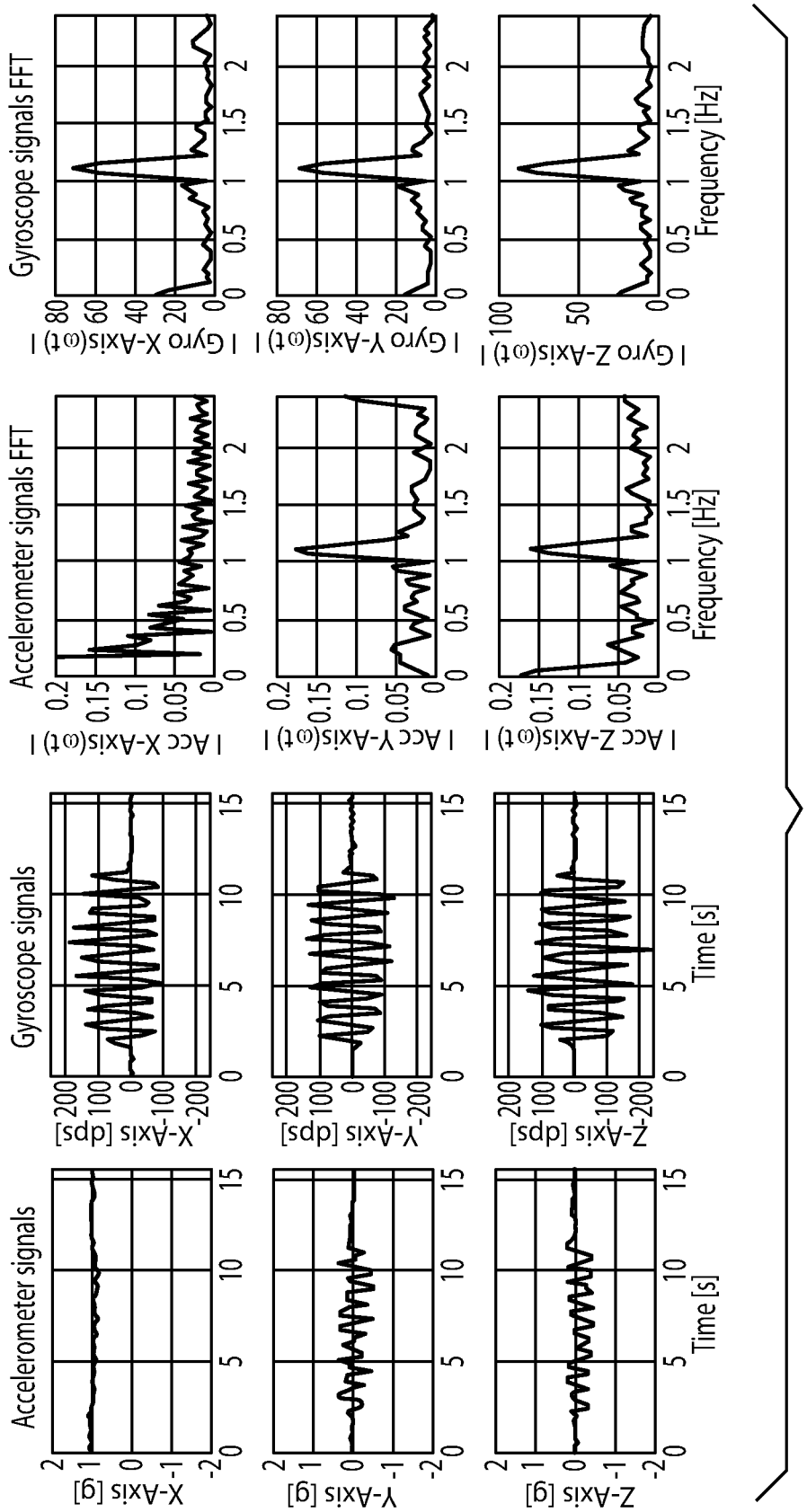
FIG. 12 shows accelerometer and gyroscope signals during a stirring movement of the cooking utensil.

The control unit 24 of the cooking hob 20 receives signals from the kitchen utensil 10, and, particularly, signals from accelerometer 12a and gyroscope 12b, so that the control unit 24 can elaborate such data and assess by analyzing the trend of these values versus time how the kitchen utensil 10 is either moved by the cook or how such kitchen utensil 10 is placed in a stationary configuration (vertical, horizontal, inclined). By elaborating such information, the control unit 24 can correctly interpret the other values of further sensors 12c, 12d, and 12e, for instance, by disregarding such values when they do not fit with the current spatial configuration of the kitchen utensil 10. Moreover, the control unit 24 drives the heating elements of the cooking hob 20 according to the way in which the cook manipulates and places the kitchen utensil 10. Data received from the accelerometer 12a and/or the gyroscope 12b, or any other inclination sensor, are preferably processed by the control unit 24 through known statistical and spectrum analysis techniques (as shown in FIG. 12).

According to the present invention, in steady state condition, the spatial orientation of the cooking utensil 10 can be easily obtained from only the accelerometer signals according to the following relationships:

$$\text{Pitch} = \alpha = \text{atan2}\left(\frac{A_x}{\sqrt{A_y^2 + A_z^2}}\right);$$

$$\text{Roll} = \beta = \text{atan2}\left(\frac{A_y}{\sqrt{A_x^2 + A_z^2}}\right);$$

$$\text{Yaw} = \gamma = \text{atan2}\left(\frac{A_z}{\sqrt{A_x^2 + A_y^2}}\right)$$

wherein:

Pitch ($\alpha$) is the angle between the X-axis of the Micro Electro Mechanical System (MEMS in the following) device, which is the mechanical construction comprising the accelerometer and the gyroscope sensors, and horizontal plane;

Roll ($\beta$) is the angle between MEMS Y-axis and the horizontal plane, and

Yaw ($\gamma$) is the angle between MEMS Z-axis and the horizontal plane.

Ax, Ay, and Az are the accelerometer signals, which in steady state condition represent components of the earth gravity vector on the three axes of the kitchen utensil 10.

The Applicant has discovered that accelerometer and/or gyroscope sensors can be used to identify and recognize any kind of movement of the kitchen utensil 10. Moreover, the Applicant has surprisingly discovered that signals sampled from the sensors during certain movements of the kitchen utensil 10 in some specific cooking preparations are substantially independent on the cook involved in the same preparations.

On the other hand, the Applicant has also measured that for some specific cooking preparations, the data pattern from the sensor(s) is substantially stable among repeated recipes. This allows identifying a specific footprint associated with each cooking preparation. Repeatability of the results also makes an assessment of a cook's behavior much easier.

Figure 11:
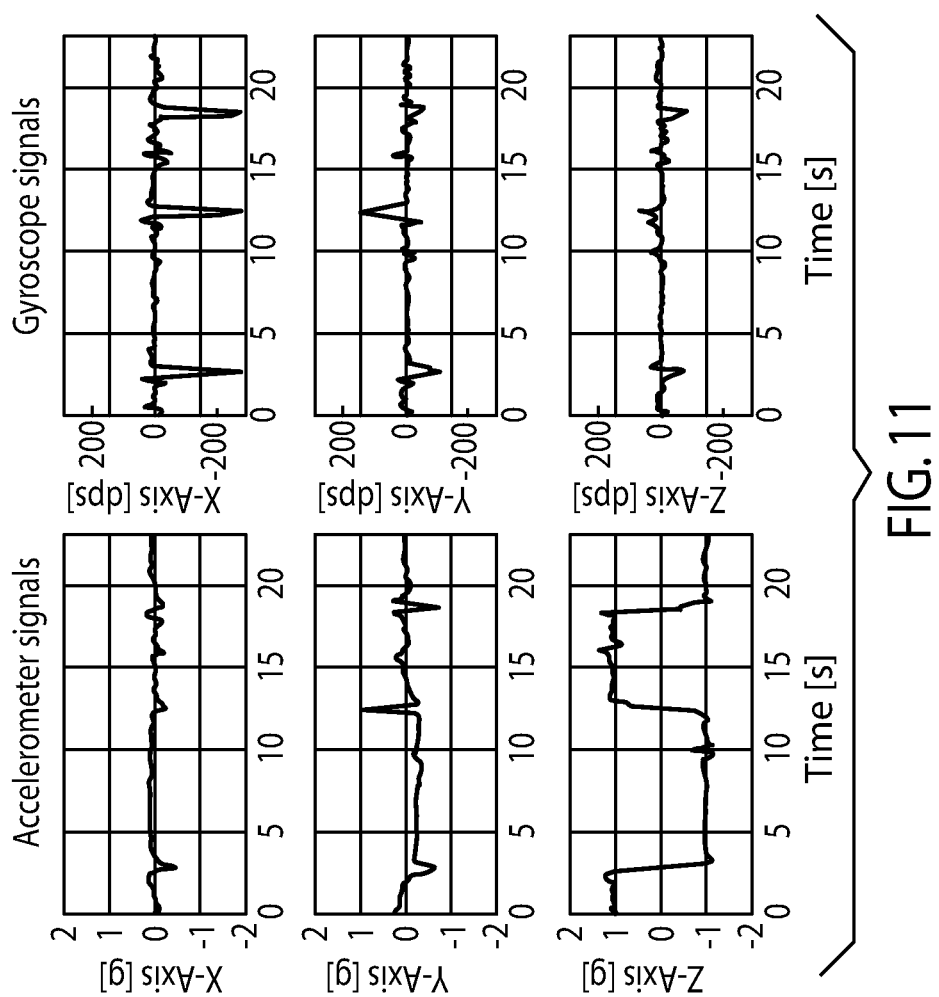
FIG. 11 shows accelerometer and gyroscope signals during a flipping movement of the cooking utensil.
Figure 13:
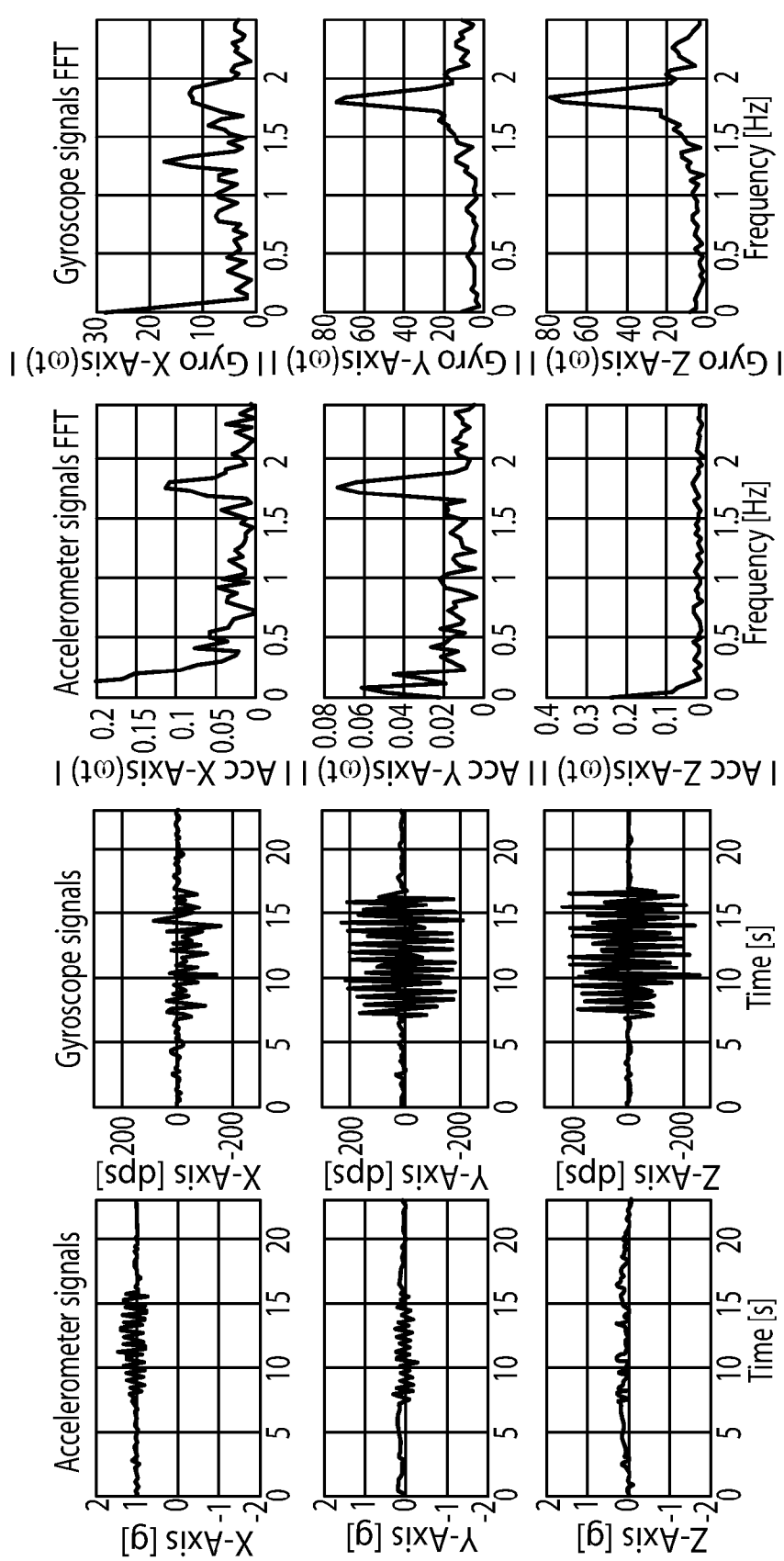
FIG. 13 shows accelerometer and gyroscope signals during a whisking movement of the cooking utensil.

As a non-limitative example, accelerometer and gyroscope signals are used to identify any kind of movement of the kitchen utensil 10, as described in FIGS. 11, 12, and 13, in connection with stirring, whisking, and flipping actions performed by the cook with the kitchen utensil 10 during food preparation.

As can be seen from FIG. 11, a flipping gesture is characterized by a wide half wave signal on the X-axis gyroscope signal, during which the Z-axis accelerometer signal changes sign due to gravity. Furthermore, the integral of the X-axis gyroscope signal over the gesture duration must be equal to $\pi$ radians, because the total rotation performed by the utensil is equal to 180°.

Thus, a possible method for detecting a flipping action can be: if the Z-axis accelerometer signal decreases in absolute value while other accelerometer signals are approximately at zero, the system starts to integrate the X-axis gyroscope signal until it becomes approximately equal to $\pi$ radians, which identify the flipping gesture. In the case that the calculated integral is less or greater than $\pi$, it is possible to conclude that the gesture was not a complete flip.

In case of stirring and whisking gestures, the recognition of such gestures can be obtained by processing the accelerometer and gyroscope signals with a known Fast Fourier Transform (FFT) algorithm.

In both cases, accelerometer and gyroscope signals result in sinusoidal signals on a certain axis. The processing of these signals with an FFT algorithm reveals that the fundamental frequency of the signal exactly corresponds to the number of turns per second of the kitchen utensil 10.

The two gestures can be discriminated not only by the frequency of rotation (higher in case of whisking with respect to stirring), but also by monitoring the rotation axis. In the case of stirring, the FFT analysis shows significant signal components of the accelerometer only on Y-axis and Z-axis, and significant signal components on all three axes of the gyroscope. In the case of whisking, due to different disposition of the kitchen utensil 10, significant signal components can be detected only on X-axis and Y-axis of accelerometer and on Y-axis and Z-axis of the gyroscope.

Furthermore, as shown in FIG. 3 upon the detection of the vertical position of the kitchen utensil 10 from data received from the gyroscope 12b, the control unit 24 can then attribute the values of the temperature sensor 12e placed on one tip B of the tongs to the actual temperature of the content of the pan P.

In a similar way, the kitchen utensil 10 shown in FIG. 4 provides to the control unit data from at least an impedance sensor 12d in order to assess starch or salt concentration in the cooking vessel Q. Also, the almost horizontal configuration of the kitchen utensil 10 shown in FIG. 5 can be detected by means of the gyroscope 12b and signals from other sensors are interpreted accordingly.

According to FIG. 6, the cooking hob 20 is also provided with a user interface 30, which can inform the cook, in an interactive way and on the basis of data received from the acceleration and spatial position sensors 12a, 12b, as to the proper act to be performed in the cooking process (for instance, in a grilling process, the user interface 30 can inform the cook of the need to flip the food).

With reference to FIGS. 7 and 8, a kitchen utensil 110 in the form of a fork is shown, which is made of two parts 110a and 110b, which can be assembled together. The part 110a carries the temperature and impedance sensors 12e and 12d and having longitudinal rails 112 which cooperate with corresponding longitudinal grooves 114 provided in the second part 110b, which is also the handle of the kitchen utensil 110. Such handle 110b has a cover 116 for the battery 14 and electrical contacts 118 for electrical connection of sensors 12d and 12e. The fork part 110a of the kitchen utensil 110 is also provided with a notch 120 for supporting the kitchen utensil 110 on the sidewall of a pot P or similar cooking vessel. The solution shown in FIGS. 6 and 7 has the advantage of requiring only one "handle" 110b with the electronics that can be coupled with different parts configured to be in contact with the food and having different shapes.

FIGS. 9a to 9d show a similar kitchen utensil 210 where, in correspondence with the handle thereof, the kitchen utensil 120 is provided with a concave seat 212 for placing a cartridge 214 containing the electronic unit carrying the accelerometer 12a, the gyroscope 12b, the battery 14, the microcomputer 16, and the radio transmitter 18. A cartridge 214 is provided with an unlock sliding button 216 which is operated by the cook in order to unlock the cartridge 214 from the seat 212 (sequence indicated in FIGS. 9b to 9c). The cartridge 214 is also provided with a flat spring 218, which urges the cartridge 214 out of its seat 212 once the cook activates the sliding button 216. For electrically connecting the electronic unit to the sensors on the tip of the kitchen utensil 210, the seat 212 is provided with electrical contacts 220 configured to cooperate with corresponding contacts of the cartridge 214 in order to assure electrical connection from sensors provided on the tip of the kitchen utensil 210 to the electronic unit by means of wires 220, which are preferably insulated with Kapton.

The embodiment shown in FIG. 10 refers to a kitchen utensil 310 having a soft touch body 312 in different forms (a pair of tongs and a spoon are shown in FIG. 10) into which an "intelligent" part 314 is inserted. Such part 314 contains a printed circuit board 316, a battery 14, and the accelerometer 12a and gyroscope 12b as well. The fact that the body 312 is made of soft polymeric material has the advantage of assuring insulation of the sensors 12d and 12e placed on the tip of the tongs or spoon. Moreover, between the part 314 and the soft touch body 312, a light source 318 in the form of a ring is interposed which can inform the cook when the kitchen utensil 310 is transmitting data to the control unit 24 of the cooking hob 20.

Even if the cooking system according to the invention has been disclosed with reference to an electric or electronic cooking hob 20 (for instance, an induction cooking hob), nevertheless it can also be also in connection with a gas cooking hob where the heating power is adjusted electronically by means of valves.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "operably coupled" and "operably connected" generally mean that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A cooking system including a kitchen utensil and a household electrical cooking appliance, such kitchen utensil having one or more sensors that are arranged on the kitchen utensil, wherein the sensors generate position and/or acceleration information are selected from the group consisting essentially of an acceleration sensor, a gyroscopic sensor, an inclination sensor, or a combination thereof, the cooking appliance being provided with a control unit configured to receive data from the sensors in order to evaluate the information to assess how the kitchen utensil is used and to control the cooking appliance in response thereto; and
   wherein the kitchen utensil comprises a handle with a concave seat for receiving a removable cartridge carrying a battery, a microcomputer, a radio transmitter, and at least one sensor chosen from the acceleration sensor, the gyroscopic sensor, and the inclination sensor, wherein the cartridge is provided with an unlock sliding button which may be operated to unlock the cartridge from the concave seat and the concave seat is provided with a spring urging the removable cartridge out of the concave seat upon activation of the sliding button.

2. The cooking system according to claim 1, wherein the kitchen utensil further comprises an end opposite the handle upon which a temperature sensor or an electrical impedance sensor are disposed, and wherein the concave seat further comprises electrical contacts electrically connecting the cartridge to the kitchen utensil and configured to cooperate with corresponding contacts of the cartridge to assure electrical connection from sensors on the tip of the kitchen utensil to cartridge.

3. The cooking system according to claim 2, wherein the control unit is configured to process data from the temperature sensor or the impedance sensor conditional upon data received from the acceleration sensor, the gyroscopic sensor, or the inclination sensor.

4. The cooking system according to claim 1, wherein the kitchen utensil is in the form of tongs and further comprises a strain gauge sensor in a zone of the kitchen utensil opposite a pair of free ends of the tongs.

5. The cooking system according to claim 1, wherein the cooking appliance comprises a user interface configured to provide instructions to the user on the basis of information derived from data captured by the acceleration sensor, the gyroscopic sensor, or the inclination sensor.

6. The cooking system according to claim 1, wherein the removable cartridge is configured to be attached to the handle of the kitchen utensil configured as a spoon, a ladle, a pair of tongs, or a needle.

7. The cooking system according to claim 2, wherein the removable cartridge carrying the acceleration sensor, the gyroscopic sensor, or the inclination sensor further comprises electrical contacts and the concave seat further comprises corresponding electrical contacts configured to cooperate with the electrical contacts of the removable cartridge in order to provide electrical connection with the temperature sensor or an electrical impedance sensor disposed on the end of the kitchen utensil opposite the handle.

8. A method of controlling a household electrical cooking appliance comprising the use of a kitchen utensil having an acceleration sensor, a gyroscopic sensor, or an inclination sensor disposed within a removable cartridge, the removable cartridge being removably mountable within a concave seat in a handle of the kitchen utensil, wherein the removable cartridge carries a battery, a microcomputer, a radio transmitter, and at least one sensor chosen from the acceleration sensor, the gyroscopic sensor, and the inclination sensor, wherein the cartridge is provided with an unlock sliding button which may be operated to unlock the cartridge from the concave seat and the concave seat is provided with a spring urging the removable cartridge out of the concave seat upon activation of the sliding button, and wherein the method comprises the steps of:
   collecting position and/or acceleration data from the at least one sensor chosen from the acceleration sensor, the gyroscopic sensor, and the inclination sensor, or a combination thereof;
   communicating such data to a control unit of the cooking appliance; and
   evaluating such data in order to assess how the utensil is used by the user.

9. The method according to claim 8, wherein the step of evaluating such data in order to assess how the kitchen utensil is used by the user comprises the step of recognizing the position and/or movement of the kitchen utensil.

10. The method according to claim 8, further comprising the step of controlling the cooking appliance on the basis of such evaluation of data.

11. The method according to claim 8, further comprising the step of assisting the user by providing instructions though a graphical user interface, wherein actions are suggested to the user on the basis of the above evaluation of data to assist the user in the execution of a multistep recipe.

12. The method according to claim 11, further comprising the steps of:
   measuring the temperature through the kitchen utensil; and
   further associating the temperature to the detected position and/or movement of the cooking utensil.

* * * * *